United States Patent [19]

Saito et al.

[11] Patent Number: 5,761,345

[45] Date of Patent: Jun. 2, 1998

[54] IMAGE PROCESSING APPARATUS SUITABLE FOR MULTISTAGE COMPRESSION

[75] Inventors: Kazuhiro Saito; Yukari Shimomura, both of Yokohama, Japan

[73] Assignee: Canon Kabushiki Kaisha, Tokyo, Japan

[21] Appl. No.: 773,219

[22] Filed: Dec. 23, 1996

Related U.S. Application Data

[63] Continuation of Ser. No. 93,634, Jul. 20, 1993, abandoned.

[30] Foreign Application Priority Data

Jul. 31, 1992 [JP] Japan .................... 4-205247

[51] Int. Cl.$^6$ ................... G06K 9/36; G06K 9/46
[52] U.S. Cl. ............... 382/246; 348/419; 341/67; 382/239
[58] Field of Search ................... 382/250, 240, 382/246, 248, 239; 358/433, 432, 261.1, 261.2, 261.3, 427; 364/715.02; 341/65, 67; 348/419

[56] References Cited

U.S. PATENT DOCUMENTS

| | | | |
|---|---|---|---|
| 3,215,773 | 11/1965 | Chatten et al. | 178/6.8 |
| 3,483,317 | 12/1969 | Groat | 178/6 |
| 3,992,572 | 11/1976 | Nakagome et al. | 178/6 |
| 4,225,885 | 9/1980 | Lux et al. | 340/146.3 |
| 4,394,774 | 7/1983 | Widergren et al. | 382/56 |
| 4,546,385 | 10/1985 | Anastassiou | 358/133 |
| 4,586,082 | 4/1986 | Wilkinson | 358/160 |
| 4,772,956 | 9/1988 | Roche et al. | 358/260 |
| 4,920,426 | 4/1990 | Hatori et al. | 358/133 |
| 4,965,754 | 10/1990 | Stansfield et al. | 364/526 |
| 4,969,040 | 11/1990 | Gharavi | 358/136 |
| 4,987,480 | 1/1991 | Lippman et al. | 358/13 |
| 5,034,990 | 7/1991 | Klees | 382/22 |
| 5,038,390 | 8/1991 | Chandran | 382/248 |

(List continued on next page.)

FOREIGN PATENT DOCUMENTS

| | | | |
|---|---|---|---|
| 469852 | 2/1992 | European Pat. Off. | G06F 15/64 |
| 487282 | 5/1992 | European Pat. Off. | G06F 15/64 |
| 0510933 | 10/1992 | European Pat. Off. | H04N 1/41 |
| 075773 | 4/1987 | Japan | G06F 15/62 |
| 2122763 | 5/1990 | Japan | H04N 1/383 |
| 276263 | 12/1991 | Japan | G06F 15/62 |
| 2102240 | 1/1983 | United Kingdom | H04N 1/28 |
| 2259824 | 3/1993 | United Kingdom | H04N 7/13 |

OTHER PUBLICATIONS

ICASSP-89:1989 International Conference On Acoustics, Speech and Signal Processing (IEEE Cat.No. 89 CH2673-2), Glasgow, UK, 23–26 May 1989, 1671–1674, vol. 3, Saito, T. et al. "Self–Organizing Pattern–Matching Coding for Picture Signals".

Proceedings of the I.R.E., vol. 40, No. 9, Sep. 1952, pp. 1098–1101, Huffman, D.A. "A Method For The Construction of Minimum–Redundancy Codes".

"A Single Chim Compression/Decompression LSI Based On JPEG", K. Ogawa, et al., International Conference On Consumer Electronics, Digest of Technical Papers, ICCE, 2–4 Jun. 92, Rosemont, Illinois, US, IEEE, 1992, pp. 386–387.

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

An image processing apparatus initially stores variable length codes corresponding to a significant frequency component, and variable length codes corresponding to a less significant frequency component If while storing the variable length codes into the storage means, it is detected that the storage means is full (with variable length codes), the control means makes room for the storage of further variable length codes corresponding to the more significant frequency component by canceling variable length codes stored in the storage means which correspond to the frequency component.

7 Claims, 13 Drawing Sheets

U.S. PATENT DOCUMENTS

| | | | |
|---|---|---|---|
| 5,040,233 | 8/1991 | Davy et al. | 382/56 |
| 5,047,852 | 9/1991 | Hanyu et al. | 358/133 |
| 5,063,608 | 11/1991 | Siegel | 382/56 |
| 5,073,820 | 12/1991 | Nakagawa et al. | 358/133 |
| 5,073,821 | 12/1991 | Juri | 358/133 |
| 5,086,439 | 2/1992 | Asai et al. | 375/122 |
| 5,086,488 | 2/1992 | Kato et al. | 382/56 |
| 5,101,280 | 3/1992 | Moronaga et al. | 358/426 |
| 5,109,451 | 4/1992 | Aono et al. | 382/56 |
| 5,148,271 | 9/1992 | Kato et al. | 382/246 |
| 5,148,498 | 9/1992 | Resnikoff et al. | 382/248 |
| 5,162,923 | 11/1992 | Yoshida et al. | 358/433 |
| 5,204,756 | 4/1993 | Chevion et al. | 358/426 |
| 5,216,518 | 6/1993 | Yamagami | 358/426 |
| 5,243,420 | 9/1993 | Hibi | 358/136 |
| 5,249,053 | 9/1993 | Jain | 358/209 |
| 5,249,066 | 9/1993 | Fukuda et al. | 358/433 |
| 5,253,075 | 10/1993 | Sugiyama | 358/433 |
| 5,267,333 | 11/1993 | Aono et al. | 382/56 |
| 5,295,203 | 3/1994 | Krause et al. | 382/248 |
| 5,301,040 | 4/1994 | Hoshi et al. | 358/465 |
| 5,307,163 | 4/1994 | Hatano et al. | 382/246 |
| 5,309,525 | 5/1994 | Shimomura et al. | 382/50 |
| 5,325,448 | 6/1994 | Katayama et al. | 382/50 |
| 5,339,164 | 8/1994 | Lim | 358/261.1 |
| 5,367,629 | 11/1994 | Chu et al. | 395/162 |
| 5,379,070 | 1/1995 | Retter et al. | 348/403 |
| 5,416,603 | 5/1995 | Suzuki et al. | 358/433 |
| 5,517,327 | 5/1996 | Nakatani et al. | 358/462 |
| 5,588,075 | 12/1996 | Chiba et al. | 358/433 |

FIG. 4

| INDEX | CODED DATA | CODE LENGTH | ACCUMULATED VALUE |
|---|---|---|---|
| 0 | 0x00001FF2 | 13 | — |
| 1 | 0x0003FFA5 | 18 | 18 |
| 2 | 0x0000007C | 7 | 25 |
| 3 | 0x000035B3 | 14 | 39 |
| 4 | 0x001FC59E | 21 | 21 |
| 5 | 0x000001AC | 9 | 30 |
| 6 | 0x000072EC | 15 | 45 |
| - | - | - | - |
| - | - | - | - |
| - | - | - | - |
| 18 | 0x0000001A | 5 | 95 |
| 0 | 0x000037E2 | 14 | — |
| 1 | 0x003FA201 | 21 | 21 |
| - | - | - | - |

- DC COMPONENT (index 0)
- AC COMPONENTS (indices 1-18)
- DC COMPONENT (index 0, second block)
- AC COMPONENTS (second block)

DATA AT 1ST STAGE

RESET OF ACCUMULATED VALUE

FIG. 5

| COLOR COMPONENT | THRESHOLD VALUE (BITS) |
|---|---|
| Y COMPONENT | 40 |
| U COMPONENT | 28 |
| V COMPONENT | 28 |

FIG. 6

COMPRESSION MEMORY

| |
|---|
| SEGMENT S-1 (100KB) |
| SEGMENT S-2 (100KB) |
| SEGMENT S-3 (100KB) |
| SEGMENT S-4 (100KB) |
| ⋮ |
| SEGMENT S-N (100KB) |

FIG. 7

SEGMENT INFORMATION TABLE (START OF IMAGE) → (END OF IMAGE)

| No. | | 2 | 3 | 4 | 5 | 6 | 7 | 8 | 9 | 10 | 11 |
|---|---|---|---|---|---|---|---|---|---|---|---|
| STAGE (1) | 1 | S-1 | S-5 | S-8 | S-10 | S-14 | - | S-(N-1) | S-4 | S-15 | END |
| STAGE (2) | 1 | S-2 | S-6 | S-9 | S-13 | - | - | S-N | S-11 | END | END |
| STAGE (3) | 1 | S-3 | S-7 | S-12 | - | - | S-(N-2) | END | END | END | |
| STAGE (4) | 0 | S-4 | S-11 | S-15 | - | - | - | | | | |

1: STAGE USED
0: STAGE CANCELLED

FIG. 10

| INDEX | CODED DATA | CODE LENGTH |
|---|---|---|
| 0 | 0×00001FF2 | 13 |
| 1 | 0×0003FFA5 | 18 |
| 2 | 0×0000007C | 7 |
| 3 | 0×000035B3 | 14 |
| 4 | 0×001FC59E | 21 |
| 5 | 0×000001AC | 9 |
| 6 | 0×000072EC | 15 |
| ' | ' | ' |
| ' | ' | ' |
| ' | ' | ' |
| 18 | 0×0000001A | 5 |
| 0 | 0×000037E2 | 14 |
| 1 | 0×003FA201 | 21 |
| ' | ' | ' |

DC COMPONENT → (index 0, first block)
AC COMPONENTS { (indices 1–18, first block)
DC COMPONENT → (index 0, second block)
AC COMPONENTS { (index 1+, second block)

F I G. 12

|             | 1ST STAGE | 2ND STAGE | 3RD STAGE |
|-------------|-----------|-----------|-----------|
| Y COMPONENT | 3         | 8         | 15        |
| U COMPONENT | 2         | 7         | 13        |
| V COMPONENT | 2         | 7         | 13        |

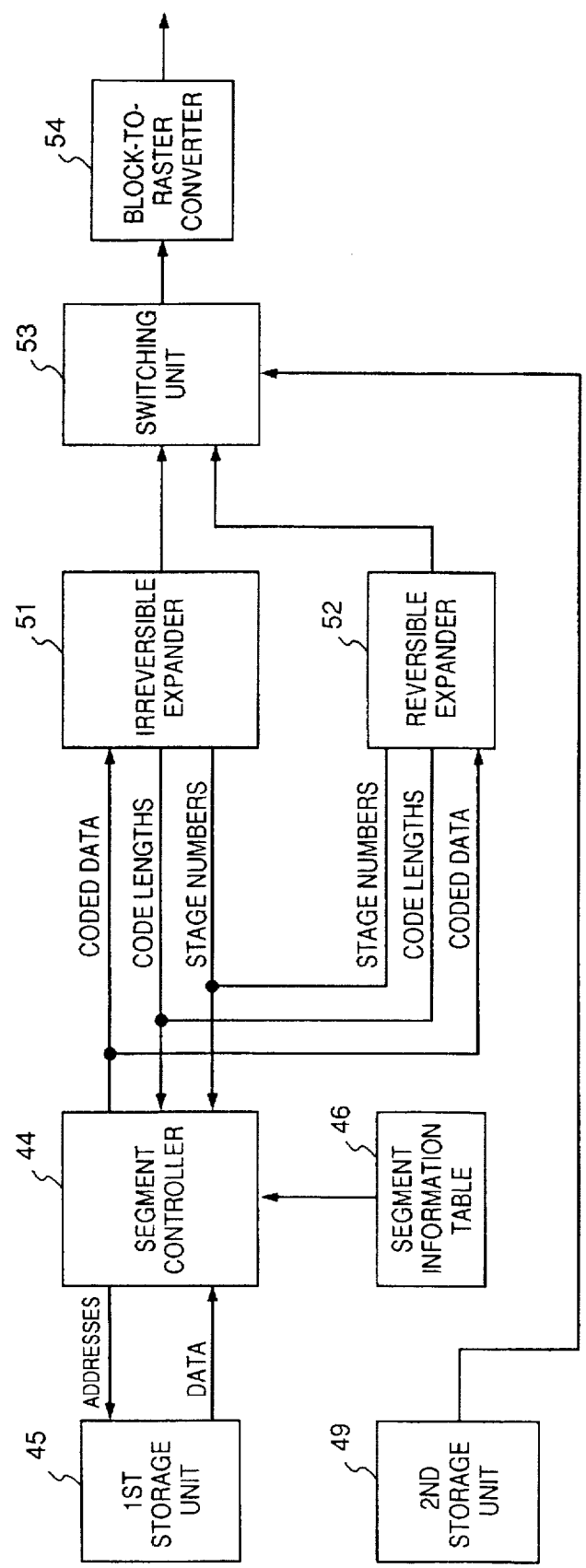

IMAGE PROCESSING APPARATUS SUITABLE FOR MULTISTAGE COMPRESSION

This application is a continuation of application Ser. No. 08/093,634 filed Jul. 20, 1993, now abandoned.

BACKGROUND OF THE INVENTION

The present invention relates to an image processing method and an image processing apparatus for coding frequency components of images in units of blocks and outputting the coded data divisionally in a plurality of stages.

Recently, with the advent of color output equipment, color DTP in which a computer processes graphics, characters, images, and the like to form a single image has been rapidly developed.

Since the quantity of data is enormous in processing color images formed by the DTP using a computer or the like, the processing requires a large-capacity memory for storing the data and a high communication time cost for communicating the data. To reduce the memory capacity or the communication time cost, an image data compression technique is essential, and so a variety of compression methods have been proposed.

As a general compression method for processing color multivalue images, an ADCT (Adaptive Discrete Cosine Transform) compression method according to a JPEG (Joint Photographic Expert Group) is usable. The ADCT compression method is a compression method for compressing primarily natural images, and a high compression ratio can be expected in this method although the method is an irreversible compression method.

The ADCT compression method performs compression as follows. First, a 3-primary-color (RGB) signal is converted into three components of Y, U, and V. Y indicates a luminance component, and U and V indicate chromaticity components. By making use of the fact that the visual sense of man is more sensitive to a luminance component than to a chromaticity component, the Y component is compressed without changing the resolution, whereas the U and V components are compressed while the resolution is lowered by subsampling.

Subsequently, each component of the YUV data obtained by the subsampling is subjected to DCT in units of blocks each having a size of 8×8 and extracted as a spatial frequency component. The component processed by the DCT will be referred to as a "DCT coefficient" hereinafter. These DCT coefficients are linearly quantized (divided) by using quantization tables which are provided for each set of a luminance component (Y) and chromaticity components (U and V), and each of which has a size of 8×8. The resulting coefficients thus quantized will be referred to as "quantized coefficients" hereinafter. Lastly, these quantized coefficients are coded by using Huffman coding which is a variable-length coding method.

The foregoing is the compression procedure according to the ADCT compression method.

Since, however, the Huffman coding used in the process of the above ADCT compression method is a variable-length coding method, the quantity of compressed data is unknown until coding is finished. It is, therefore, impossible to control the quantity of data to a target compressed data quantity (i.e., impossible to compress whole image data into a predetermined fixed length).

In addition, when this ADCT compression method is applied to characters and graphics formed by CG (Computer Graphics), many errors occur in the subsampling or the quantization, resulting in considerable degradation in the characters and the graphics.

SUMMARY OF THE INVENTION

The present invention has been made to solve the above problems and has as its object to provide an image processing method and an image processing apparatus capable of controlling the quantity of code data to a target data quantity.

It is another object of the present invention to provide an image processing apparatus and an image processing method capable of monitoring an amount of code data received in sequence, and assigning stage information to the code data in accordance with the code amount monitored.

It is still another object of the present invention to provide an image processing apparatus and an image processing method capable of performing reversible coding or irreversible coding adaptively in accordance with the characteristic feature of an image (e.g., whether an image is a character image or a halftone image) of input block image data, thereby compressing the image into an appropriate code quantity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram showing data stored in a buffer memory 15 of the first embodiment;

FIG. 5 is a diagram showing a threshold value table;

FIG. 6 is a diagram showing the arrangement of a compression memory divided into segments;

FIG. 7 is a diagram showing the arrangement of a segment information table;

FIG. 10 is a diagram showing data stored in a buffer memory 22 of the second embodiment;

FIG. 12 is a diagram showing an index table;

FIG. 14 is a block diagram showing the arrangement of an image expanding apparatus of the fourth embodiment.

DETAILED DESCRIPTION OF THE PREFERRED EMBODIMENTS

Preferred embodiments of the present invention will be described in detail below with reference to the accompanying drawings.

<Overall Arrangement>

Figure 1:
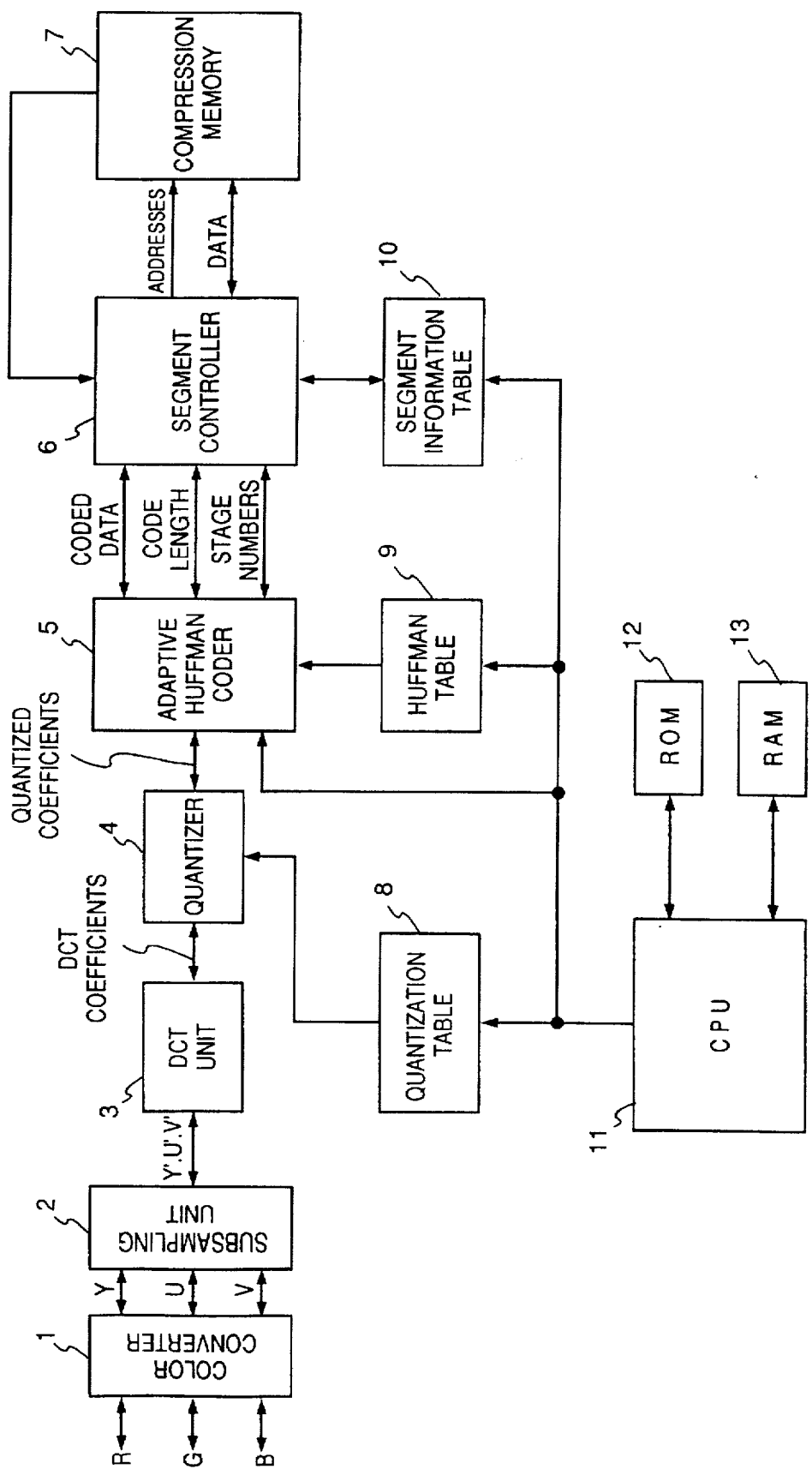
FIG. 1 is a block diagram showing the arrangement of an image processing apparatus according to an embodiment of the present invention.

FIG. 1 is a block diagram showing the arrangement of an image processing apparatus according to an embodiment of the present invention. Referring to FIG. 1, a CPU 11 performs control of the whole apparatus and settings of several different tables. A ROM 12 stores these tables, and a RAM 13 serves as a work area for computing the settings of the tables.

Processing for compressing image data will be described below.

First, a color converter 1 converts input RGB image data into Y, U, and V components through a 3×3 linear matrix conversion represented by Equation (1) below:

$$\begin{bmatrix} Y \\ U \\ V \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \quad (1)$$

Subsequently, a subsampling unit 2 performs subsampling for the Y, U, and V signals from the color converter 1 by using the fact that the sensitivity characteristic of a human eye is more sensitive to a luminance component (Y) than chromaticity components (U and V). In this subsampling, U and V are compressed at one of the following three compression ratios: Y U:V=4:4:4 (no subsampling), Y:U:V= 4:2:2 (subsampling is performed for U and V), and Y:U:V= 4:1:1 (subsampling is performed for U and V). The subsampling unit 2 outputs the signals in units of 8×8 blocks. The individual signals are output in an order of Y1, U1, V1, Y2, U2, V2, . . . , in the case of Y:U:V=4:4:4, in an order of Y1, Y2, U1, V1, Y3, Y4, U2, V2, . . . , in the case of Y:U:V=4:2:2, and in an order of Y1, Y2, Y3, Y4, U1, V1, Y5, Y6, Y7, Y8, U2, V2, . . . , in the case of Y:U:V=4:1:1.

Figure 2:
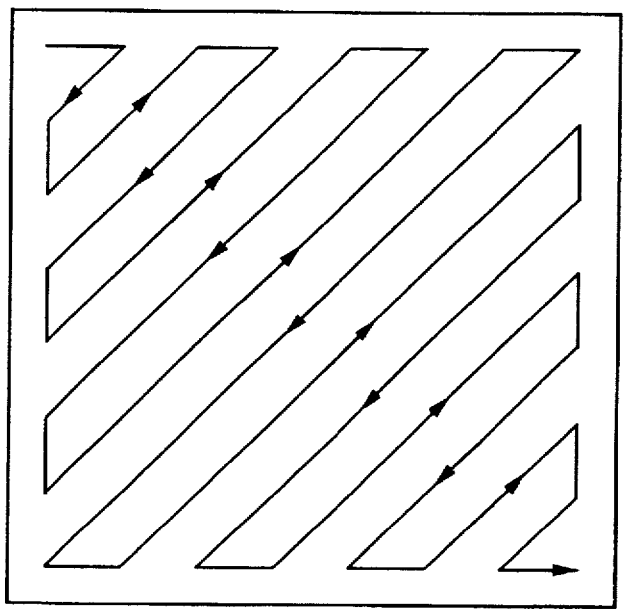
FIG. 2 is a diagram showing the scan direction in a zigzag scan operation.

A DCT unit 3 performs a DCT for these output data in units of 8×8 blocks, outputting DCT coefficients. A quantizer 4 quantizes the DCT coefficients in units of 8×8 blocks by using a quantization table 8, thereby outputting quantized coefficients. The quantizer 4 also rearranges 64 two-dimensional quantized coefficients into one-dimensional quantized coefficients from lower-frequency components to higher-frequency components in accordance with a scan in a zigzag order as shown in FIG. 2, and supplies the rearranged quantized coefficients to an adaptive Huffman coder 5. The adaptive Huffman coder 5 encodes the consequent one-dimensional data in units of 64 quantized coefficients in accordance with the method shown in FIG. 3 (to be described in detail later), and outputs the coded data, the length ("code length" represented by the number of bits) of each coded data, and a number (to be referred to as a "stage number" hereinafter) representing a stage to which the corresponding coded data is assigned. In this embodiment, four stages are provided as an example.

On the basis of the "coded data", the "code length", and the "stage number", a segment controller 6 writes compressed data, corresponding to a stage indicated by the "stage number", into a compression memory 7. This compression memory is divided into segments (see FIG. 6), and each piece of compressed data is written in a segment corresponding to the stage of that data. The information separated in these segments are also written in a segment information table 10 (see FIG. 7) at the same time. The data written in the information table 10 is used in data expansion. The segment controller 6 controls the segments for storing data assigned to the individual stages, making fixed-length compression possible.

The reason why this "fixed-length compression" is possible will be briefly described below.

As described above, the quantized coefficients subjected to the ADCT are arranged in an order of DC component→low-frequency AC components→high-frequency AC components. When "smaller stage numbers" are assigned to coded data with lower frequency components and "larger stage numbers" are assigned to coded data with higher frequency components, outputting or storing a large quantity of codes assigned with "larger stage numbers" makes storage of information of original images with a higher precision possible. That is, outputting or storing coded data of "larger stage numbers" means "compression" with a higher precision. Therefore, by selecting the number of stages in which data is to be compressed in accordance with the capacity of the buffer memory or the quantity of compressed data of an image to be processed, the total quantity of data assigned to the individual stages can be controlled to a target data quantity. For example, "compression is performed" (data is output or stored) in only the first and second stages, in only the first, second, and third stages, or in all of the first to fourth stages. Suppose, for example, that data quantities that can be "output" in the first, second, third, and fourth stages are 2.5, 1.5, 0.8, and 0.5 MB, respectively, and a target data quantity is 5.0 MB. In this case, a total compressed data quantity of 4.8 MB can be obtained by the use of the first, second, and third stages, thereby controlling compression within the target data quantity. As described above, the way of assignment of all coded data to the individual stages has an effect on the precision of the fixed-length coding. The segment controller 6, the compression memory 7, and the segment information table 10 will be described in more detail later <1st Embodiment . . . Data Compression>

The above adaptive Huffman coder 5 will be briefly described first with reference to FIG. 3, and then the details of the individual blocks will be described.

When a "total target bit rate number" ("bit rate" is a unit indicating a compression ratio, which is the number of bits per pixel [bits/pixel]) as the target value of a whole image and a target bit rate number in the first stage are set, the Huffman coder 5 first performs coding in the first stage and then substantially equally divides the remaining target bit rate number (="total target bit rate number"−"1st stage target bit rate number") in the block into three portions. Subsequently, the Huffman coder 5 outputs "coded data," "code length," and "stage number" in each stage such that the equally divided bit rates are assigned to the second, third, and fourth stages. Assuming, for example, that the "total target bit rate number" is 2.4 bits/pixel and the "first stage target bit rate number" is 1.5 bits/pixel for an image of an 8×8 block, the "target bit rate number" in each of the second, third, and fourth stages is 0.3.

Figure 3:
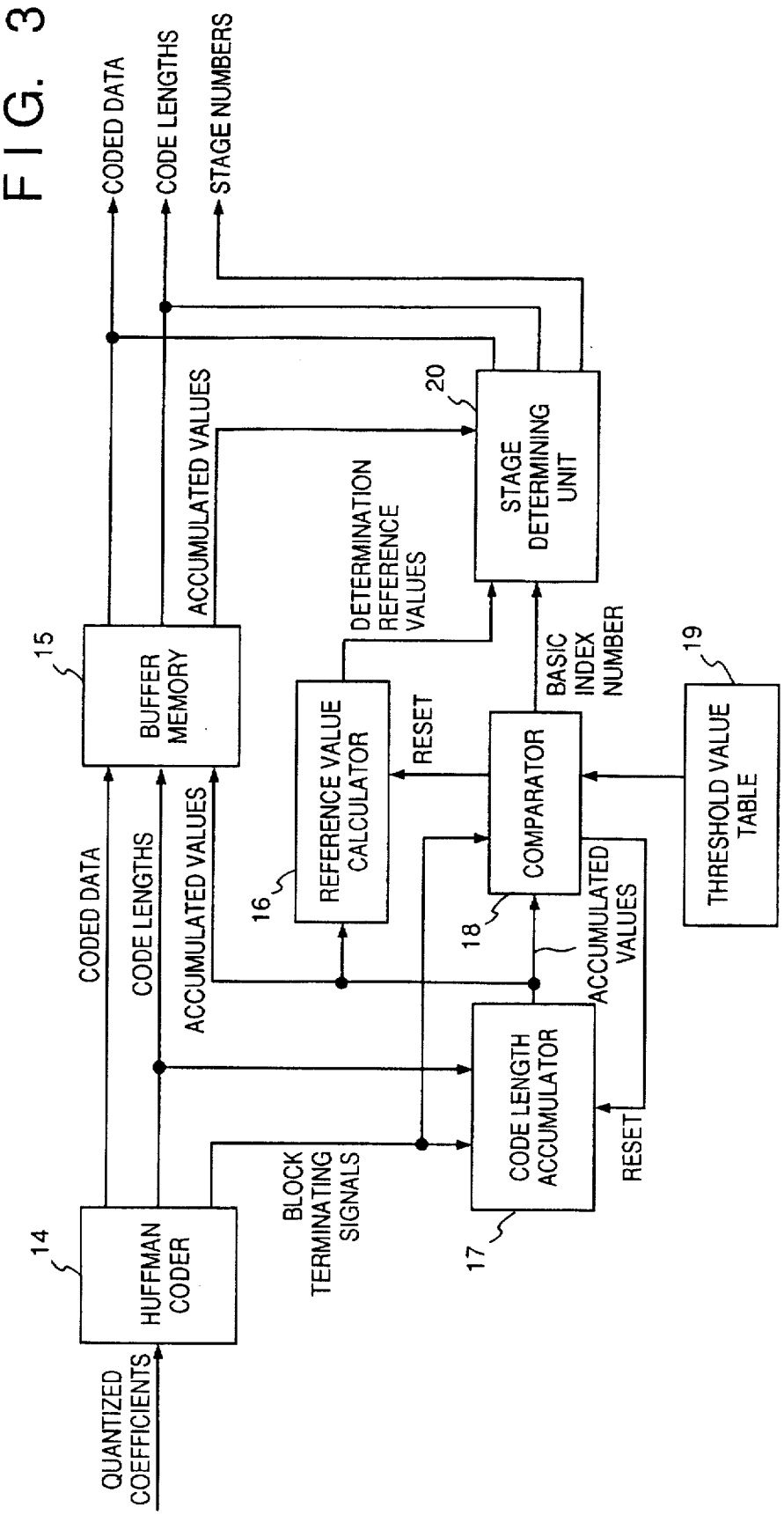
FIG. 3 is a block diagram showing the arrangement of an adaptive Huffman coder according to the first embodiment of the present invention.

The details of the adaptive Huffman coder 5 are illustrated in FIG. 3. As shown in FIG. 3, the adaptive Huffman coder 5 comprises a Huffman coder 14, a buffer memory 15, a reference value calculator 16, a code length accumulator 17, a comparator 18, and a stage determining unit 20. As described above, the coder 5 outputs coded data, code lengths, and stage numbers. The stage determining unit 20 determines a "stage number" to be assigned to each coded data coded by the coder 14. The code length accumulator 17, the comparator 18, and the reference value calculator 16 accumulate the values of the code lengths of coded data, compare the accumulated value with a predetermined threshold value, and generate, on the basis of the comparison, an "index number" obtained when the accumulated value exceeds the threshold value and also generate a separately determined "reference value". The determining unit 20 determines a "stage" on the basis of the "index number" and the "reference value". Since the stage determination is time-consuming, the buffer memory 15 is needed to output a "stage number" from the determining unit 20 in synchronism with "coded data" and its "code length" generated by the coder 14. The system shown in FIG. 3 will be described in more detail below.

In FIG. 3, the Huffman coder 14 performs Huffman coding for one-dimensionally arranged quantized coefficients arranged one-dimensionally in units of 64 quantized coefficients (for each of the 8×8-block Y, U, and V components) and outputs coded data and code lengths to the buffer memory 15 and block terminating signals each indicating the end of a block to the code length accumulator 17. The buffer memory 15 stores these data as shown in FIG. 4.

The buffer memory 15 illustrated in FIG. 4 consists of an "INDEX" field, a "CODED DATA" field for storing Huffman codes, a "CODE LENGTH" field for storing the lengths of the codes, and a "CODE LENGTH ACCUMULATED VALUE" field for storing the accumulated values of the code lengths. The "INDEX" indicates the serial numbers of output coded data in one block. The code length accumulated values are obtained from the code length accumulator 17.

In the arrangement shown in FIG. 4, values 0 to 18 are stored in the "INDEX" field for the first block, indicating that the block is coded into 19 Huffman codes. In addition, since the quantized coefficients supplied to the coder 14 are subjected to the DCT by the DCT unit 3, the first coded data has a DC component, and the subsequent coded data have AC components. Referring to FIG. 4, index 0 of the first block indicates a DC component, and indexes 1 to 18 indicate AC components.

The code length accumulator 17 accumulates the code lengths of the coded data with AC components in units of blocks in synchronism with the block terminating signals and supplies the accumulated values to the comparator 18. The comparator 18 has a threshold value table 19 containing threshold values of the Y, U, and V components to be compared with these accumulated values. FIG. 5 shows a practical example of this threshold value table. In this example, threshold values "40", "28", and "28" are set for the Y, U, and V components, respectively. The comparator 18 outputs a reset signal to the accumulator 17; that is, the comparator 18 compares the accumulated value with the threshold value. If the accumulated value exceeds the threshold value, the comparator 18 does not accumulate the code length of coded data that causes the excess but supplies the index number (to be referred to as a "basic index number" hereinafter for convenience) of the immediately preceding coded data to the stage determining unit 20 and resets the code length accumulator 17. The accumulator 17 starts accumulating code lengths again from coded data next to the basic index number. Upon detecting the termination of the block in accordance with the block terminating signal, the accumulator 17 sends the obtained accumulated value at that time (i.e., the accumulated value of code lengths obtained before the block is terminated after the resetting) to the reference value calculator 16.

The reference value calculator 16 calculates a plurality of reference values from this final accumulated value. These reference values are output to the determining unit 20, and the determining unit 20 determines stages on the basis of the reference values and the basic index number from the comparator 18.

The operation of the adaptive Huffman coder 5 according to the first embodiment will be described in more detail below with reference to FIGS. 4 and 5.

FIG. 5 shows examples of threshold values, 40, 28, and 28 [bits], for the Y, U, and V components, respectively, when the target bit rate in the first stage is set to be 1.5 [bits/pixel]. FIG. 4 presents the coded data, the code lengths, and the code length accumulated values for a certain 8×8 block of the Y component. As shown in FIG. 4, since index number 0 is a DC component, the accumulator 17 does not accumulate the code length of this DC component but writes the code lengths from the code length (=18) of the coded data of index=1 (AC component) into the field of accumulated values. The code length of the data with index number 2 is 7, so the accumulated value is 18+7=25. Similarly, the code length accumulated value for index number 3 becomes 39. Since the code length of index number 4 is "21", the code length accumulated value becomes "60". However, this value "60" is compared with the threshold value (40 bits) of the Y component by the comparator 18, yielding 60>40. Therefore, the immediately preceding index number "3" is supplied as the "basic index number" to the stage determining unit 20. The code length accumulator 17 is reset by the comparator 18, and the code length "21" of index number 4 is directly written as the code length accumulated value. The code length is "9" for index number 5, and so the code length accumulated value is 21+9=30.

The code lengths of the subsequent coded data are accumulated in the same manner as described above, and the results are written in a field of code length accumulated values until the block is terminated. The final code length accumulated value "95" at index=18 is transferred to the reference value calculator 16. The reference value calculator 16 divides 95 by 3 because the number of remaining stages is 3 and supplies the quotient "30" together with "60" which is twice the quotient as "determination reference values" to the stage determining unit 20.

On the basis of the index number (when the accumulated value exceeds the threshold value) obtained from the comparator 18 and the "determination reference values" obtained from the reference value calculator 16, the stage determining unit 20 determines a "stage" value to be assigned to each coded data and code length data. The operation of the determining unit 20 will be described in more detail below.

As described above, the data are stored in the buffer memory 15 as shown in FIG. 4. The buffer memory 15 outputs "coded data", "code length" data, and "code length accumulated value" in synchronism with each other. Of these three data, the "code length accumulated value" is supplied to the determining unit 20. The determining unit 20 also receives the "basic index number" from the comparator 18. The determining unit 20, therefore, assigns stage=1 to the coded data and the code lengths before the "basic index number". In the example of FIG. 4, since "basic index number"=3, the coded data and the code length data corresponding to index numbers=0 to 3 are processed as data of stage=1. The determining unit 20 determines and assigns stage numbers to the data of the index numbers after the "basic index number" on the basis of a plurality of determination reference values described above. That is, the determining unit 20 has received "30" and "60" as the "determination reference values". The determining unit 20, therefore, compares the "code length accumulated value" read out from the buffer memory with the "determination reference value" (=30) and assigns stage number=2 to the "coded data" and the "code length" data whose "code length accumulated value" is 30 or less. The determining unit 20 assigns stage number=3 when the "code length accumulated value" is 31 to 60 and outputs stage number=4 when it is 61 or more. In this case, at the end of each stage, an EOS (End of Stage) code indicating the end of the stage is inserted between the coded data.

As described above, data can be compressed separately in a plurality of stages in units of blocks each having a size of 8×8 (=64 coefficients). In the above operation, a bit rate of approximately 1.5 bits/pixel is assigned to the data of the first stage, and the remaining data is compressed by equally dividing the bit rate into three portions.

In the example shown in FIGS. 4 and 5, the code length accumulated value of the Y component exceeds "40". In compression of image data of a block whose code length accumulated value does not exceed 40, an EOB (End of Block) data is inserted in the middle of the data, and the coded data of the 8×8 block is entirely written in the segment for the first stage.

The "coded data", the "code lengths", and the "stage numbers" thus obtained are supplied to the segment controller 6 (FIG. 1), and the "coded data" and the "code lengths" are stored in the compression memory 7 in units of segments in accordance with the "stage numbers".

<1st Embodiment . . . Data Expansion>

A process of expanding the data that is compressed by the above-mentioned process will be described below.

The system shown in FIG. 1 can perform both compression and expansion. That is, in performing expansion of data, the system of FIG. 1 operates as an expander simply by reversing the flow of data. In this case, the DCT unit 3, the quantizer 4, and the adaptive Huffman coder 5 serve as a reverse DCT unit 3', a reverse quantizer 4', and an adaptive Huffman decoder 5', respectively. The quantization table 8 and the Huffman table 9 function as a reverse quantization table and a Huffman decoding table, respectively, reversing the flow of data to be opposite to that in the data compression.

As described above, coded data constituting one 8×8 block are separated into a plurality of stages and stored in the compression memory 7. The adaptive Huffman decoder 5', therefore, first requests the segment controller 6 to send coded data of stage number=1. The segment controller 6 reads out the coded data in the first stage from the compression memory 7 by referring to the contents of the segment information table 10 and transfers the readout data to the adaptive Huffman decoder 5'. The adaptive Huffman decoder 5' sequentially decodes the coded data thus obtained and transfers the results to the reverse quantizer 4'. The adaptive Huffman decoder 5' repeats this processing until it detects the EOS (End of Stage).

Upon detecting the EOS, the decoder 5' requests the controller 6 to send coded data of the next stage number 2. The segment controller 6 reads out the coded data in the second stage from the compression memory 7 by making reference to the contents of the segment information table 10 and transfers the readout data to the adaptive Huffman decoder 5'. The adaptive Huffman decoder 5' repeatedly executes decoding until an EOB (End of Block) code is detected, as in the compression. The decoder 5' similarly performs decoding for data in the third and fourth stages, thereby finishing decoding of one 8×8 block. In this case, if an EOB is detected in the middle of the processing, the decoder 5' starts decoding of the next 8×8 block without requesting coded data in the next stage. If data up to the final stage cannot be stored in the compression memory owing to the quantity of compressed data of an image or the capacity of the compression memory, the decoder 5' performs expansion by using data to the stage at that time.

The quantized coefficients obtained as described above are reversely quantized by the reverse quantizer 4' by using a reverse quantization table 8' and supplied to the reverse DCT unit 31. The reverse DCT unit 3' performs reverse DCT for the obtained DCT coefficients, yielding Y', U', and V' data. The subsampling unit 2 executes enlargement in accordance with the subsampling ratio (Y:U:V=4:4:4, 4:2:2, or 4:1:1). The color converter 1 performs reverse conversion in accordance with Equation (2) below, restoring the original image:

$$\begin{bmatrix} R \\ G \\ B \end{bmatrix} = \begin{bmatrix} a'_{11} & a'_{12} & a'_{13} \\ a'_{21} & a'_{22} & a'_{23} \\ a'_{31} & a'_{32} & a'_{33} \end{bmatrix} \begin{bmatrix} Y \\ U \\ V \end{bmatrix} \quad (2)$$

<1st Embodiment . . . Segmentation>

The processing of storing compressed data divided into multiple stages into the compression memory 7 constituted by a plurality of segments and storing the segment information of a selected segment into the segment information table 10, which is performed in image data compression and expansion, will be described in detail below.

As shown in FIG. 6, the compression memory 7 consists of a plurality of segments (e.g., one segment=100 KB) S-1 to S-N.

FIG. 7 shows the arrangement of the segment information table 10. The values 2 to 11 in the segment information table illustrated in FIG. 7 represent column numbers of the table, indicating the start to the end of an image in a direction from the left to the right. Each of the four data in the first column of the table 10 indicates whether the corresponding stage is used (valid) or cancelled (invalid). In the table shown in FIG. 7, stages 1 to 3 are valid (used), and stage 4 is invalid (cancelled). The four data in each of the second to the eleventh columns indicate the segment numbers (S-1 to S-N) selected in the compression memory 7, in which coded data at these stages are written. END indicates that coded data is ended in that stage.

A procedure of writing coded data at each stage into the compression memory 7, i.e., allocation of coded data in each stage to a segment will be described below. In this allocation:

(1) Coded data in the same stage for different pixels are stored in the same segment as long as an empty area is present.

(2) If a segment for storing coded data in a certain stage is full, the first one of segments which are not used by other stages is used.

Such an allocation makes effective use of the compression memory 7 free from wasted areas. This allocation will be described in detail below.

Figure 8:
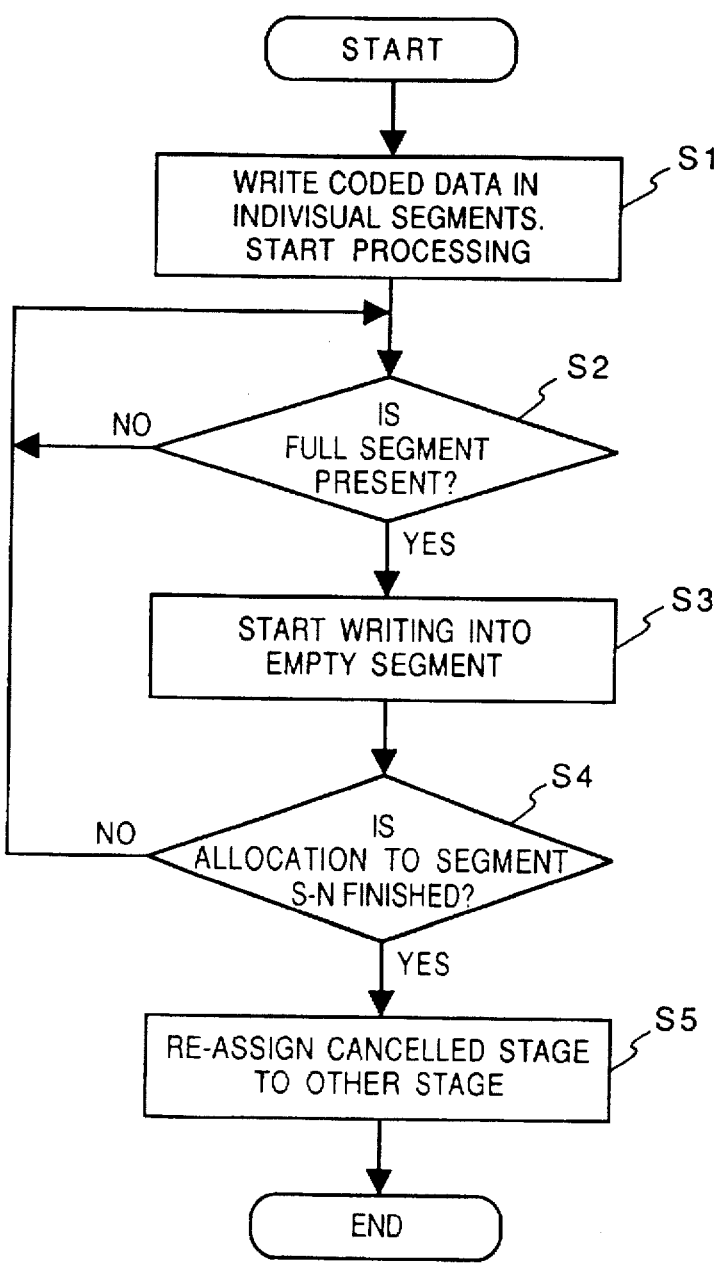
FIG. 8 is a flow chart for explaining compressed data storage processing.

FIG. 8 is a flow chart for explaining processing of storing compressed data in the above data compression. The quantities of codes of compressed data to be assigned to the individual stages change in accordance with a compression method for assigning the data to the stages or the characteristics of data of an original image. In this embodiment, however, assume that the quantity of codes output in stage 1 is larger than that output in stage 4.

On the basis of the above assumption, the control procedure of the flow chart in FIG. 8 will be described below by using the example shown in FIG. 7.

In step S1 of FIG. 8, coded data output in stages 1 to 4 for image data of the first block are written in the segments S-1, S-2, S-3, and S-4, thereby starting the processing. Coded data generated in the individual stages for the subsequent blocks will also be written in the segments S-1, S-2, S-3, and S-4. This write operation is continued until it is detected in step S2 that any of the segments is full. According to a compression method of this type, compression at stage=1 is always performed, and so coded data at stage=1 are generated in a larger quantity than those at the other stages. It is, therefore, predicted that the segment S-1 for storing the coded data at stage=1 becomes full before the segments S-2 to S-4. For this reason, if it is detected in step S2 that the segment S-1 is full, writing of the coded data at stage=1 into the segment S-5, which is the first one of unused segments, is started in step S3.

When an empty area of either the segment S-2 or S-3 for storing coded data at stage=2 or 3 becomes full, a new segment is allocated to the full stage. In the example shown in FIG. 7, the segment S-2 for stage 2 becomes full before the segment S-3 for stage 3, and the segment for stage 2 is allocated to the area S-6. Subsequently, when the segment S-3 for storing the data at stage=3 becomes full, an empty segment S-7 is allocated.

Since writing into the segment S-5 for writing the coded data at the stage 1 is finished before the segment S-4 for storing the coded data at stage=4 becomes full, an empty segment S-8 is allocated not to stage=4 but to stage=1. This occurs because the quantity of codes generated in stage 1 is larger than that in stage 4. In the same manner as described above, when a segment for writing coded data at a given stage becomes full, an empty segment is selected to write the data in it (steps S2 to S4).

The embodiment employs the method of coding an original image divisionally in several stages. For this reason, if the quantity of data to be coded in each stage is smaller than the capacity of the compression memory 7, i.e., if compression of the whole image is finished before the segment S-N is allocated, no problem of memory capacity arises. If, however, the last segment S-N is allocated before compression of the entire image is finished (YES in step S4), a segment used for coded data with a larger number (stage=4 in FIG. 7) must be freed for more significant coded data, i.e., coded data with a smaller number (stage=1 in FIG. 7). Step S5 in FIG. 8 is provided for this freeing procedure.

That is, in the example shown in FIG. 7, as the last segment S-N is used to store the coded data at stage=2, there is no empty area in the compression memory 7 at that point. Therefore, segments (S-4, S-11, and S-15 in FIG. 7) for storing the coded data at stage=4 of less significance are freed to be used as areas for storing the coded data at stage=1 or stage=2. In the example shown in FIG. 7, the coded data at stage=1, stage=2, and stage=1 are stored in the segments S-4, S-11, and S-15, respectively. Since only invalid data are stored in the fourth row indicating stage=4 in the segment information table 10, the corresponding bit in the first column is set to 0. In this manner, if the capacity of the compression memory 7 becomes insufficient, stage 4 of less significance is rendered invalid (e.g., set to "0") so that the segments S-4 and S-11, that have been used for stage 4, are used for stage=1 and stage=2, respectively. Since coding for stage=2 ends in the segment S-11, END marks are written in the subsequent columns. Since the segment S-15 which has been used for stage=4 is allocated to stage=1 and coding ends in that segment, an END mark is written in the next column.

In expanding the compressed data stored in the compression memory 7, the image data is decoded by using valid stages 1 to 3 alone.

<2nd Embodiment>

The arrangement and the operation of an adaptive Huffman coder 5 based on indexes according to the second embodiment of the present invention will be described below with reference to the block diagram shown in FIG. 9.

In the first embodiment described above, stage number is determined by accumulating code lengths and checking whether the accumulated value of code lengths reaches a predetermined value. In the second embodiment, although determination of stage=1 is performed in the same manner as in the first embodiment, determination of stages from stage=2 is performed on the basis of index numbers.

Figure 9:
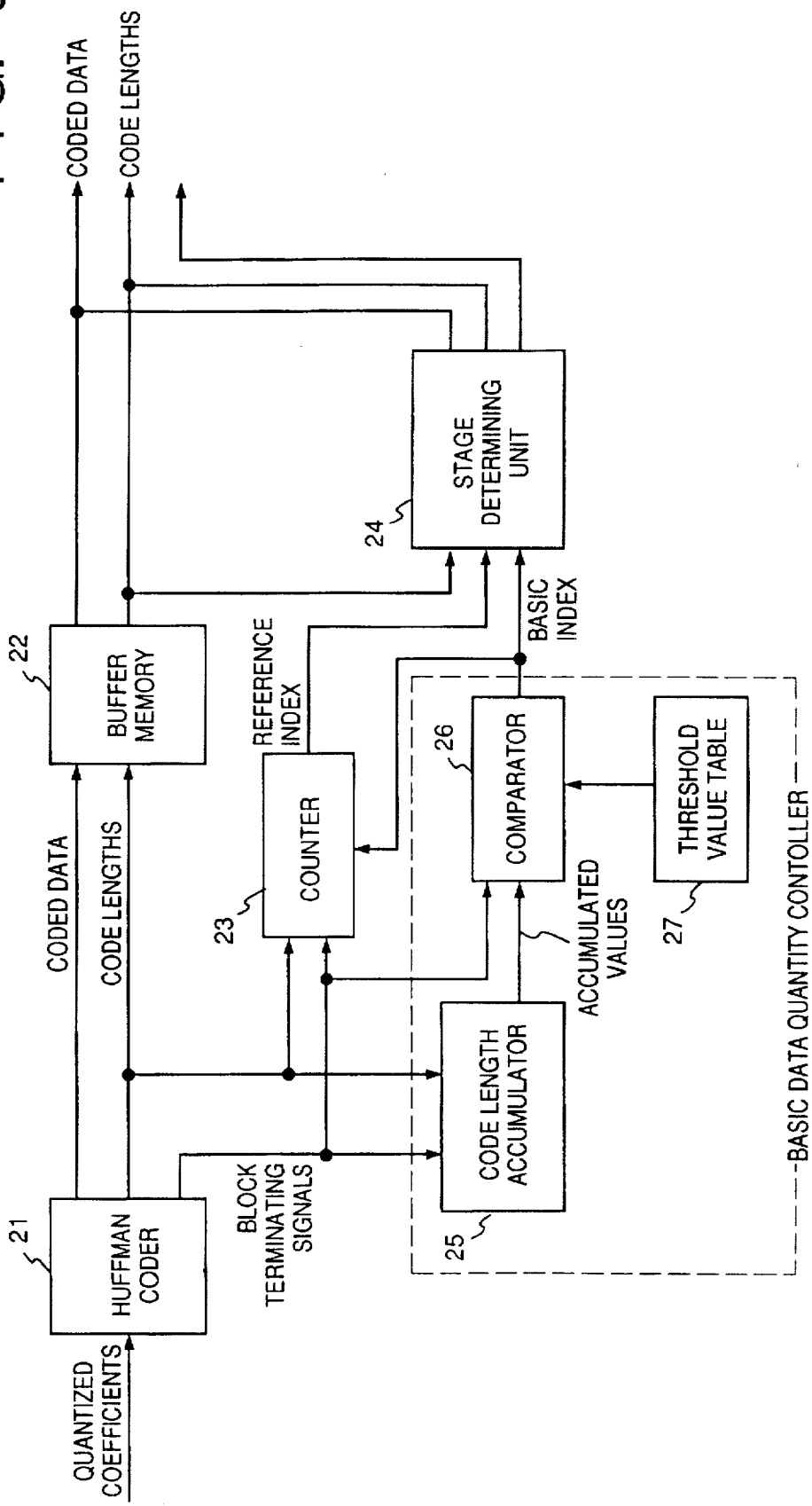
FIG. 9 is a block diagram showing the arrangement of an adaptive Huffman coder according to the second embodiment of the present invention.

Referring to FIG. 9, a Huffman coder 21 performs Huffman coding for one-dimensionally arranged quantized coefficients in units of 64 quantized coefficients (i.e., for each of 8×8-block Y, U, and V components) and outputs coded data and code lengths to a buffer memory 22. The Huffman coder 21 also outputs code length data and block terminating signals each indicating the end of a block to a code length accumulator 25. The buffer memory 22 stores the coded data and the code length data in the form as shown in FIG. 10. Referring to FIG. 10, "INDEX" is the same as the "INDEX" number in the first embodiment and indicates the serial numbers of coded data output in one block. The number of significant bits of the coded data is designated by "CODE LENGTH" as in the first embodiment.

The code length accumulator 25 accumulates the code lengths of coded data (of only an AC component) in units of blocks in synchronism with the block terminating signals and outputs the accumulated value to a comparator 26. The comparator 26 compares the accumulated value with threshold values prepared for Y, U, and V. These threshold values are supplied from a threshold value table 27 having essentially the same arrangement as that in the first embodiment. If the comparator 26 determines that the accumulated value exceeds the threshold value, the comparator 26 outputs an index immediately before the excess as a "basic index" to a counter 23 and a stage determining unit 24. Therefore, the "basic index" in the second embodiment has the same meaning as the "basic index" in the first embodiment.

When the threshold value table 27 has the threshold values as shown in FIG. 5 and the coded data are like those illustrated in FIG. 10, the accumulated value exceeds the threshold value (=40) at index=4, and the "basic index" becomes "3". In the second embodiment, coded data of indexes before the "basic index" number, i.e., coded data of indexes 0 to 3 in FIG. 10 are regarded as data at stage=1 and written in a compression memory 7 as data at stage=1.

The counter 23 counts all of the input coded data of one block; the counter 23 counts indexes from the first AC component of one block. Upon detecting from the block terminating signal that one block is terminated, the counter 23 calculates a plurality of "reference indexes" from the last index number (to be referred to as a "last index" hereinafter) and the "basic index" obtained from the comparator 26 and supplies them to the stage determining unit 24.

In the example shown in FIG. 10, since the "basic index" number is "3" and the last index number is "18," it is determined that data to which stages=2, 3, . . . , are to be allocated are those from indexes "4" to "18". Therefore, all the coded data of indexes 4 to 18 are equally divided into three groups, and stages=2, 3, . . . , are allocated to the individual divided coded data groups. More specifically, the number of codes in each group is "5" because (18−3)/3=5, and "8" (=3+5) and "13" (=8+5) are output as the "reference indexes". The block terminating signal from the Huffman coder 21 also resets the code length accumulator 25 and the comparator 26.

The stage determining unit 24 counts the indexes from the code length signals from the buffer memory 22 and can thereby monitor the index numbers of coded data being output from the buffer memory. The determining unit 24 also receives the "reference index" numbers (8 and 13 in FIG. 10) from the counter 23 and the "basic index" number (3 in FIG. 10) from the comparator 26. In the example shown in FIG. 10, since the basic index is 3 and the reference indexes are 8 and 13, the determining unit 24 outputs stage number=1 for data up to index 3 shown in FIG. 10, stage number=2 for data corresponding to indexes 4 to 8, and stage number=3 for data corresponding to indexes 9 to 13. Thereafter, the determining unit 24 outputs stage number=4 until the block is terminated. During the processing, an EOS (End of Stage) code is inserted at the end of one stage number. This code is required in data expansion.

An adaptive Huffman decoder for expanding the coded data obtained by the above coding method can be realized in the same fashion as in the first embodiment.

<3rd Embodiment>

The arrangement and the operation of an adaptive Huffman coder 5 based on indexes according to the third embodiment of the present invention will be described below. Also in this third embodiment, the number of input coded data is monitored.

First, a Huffman coder 31 performs Huffman coding for one-dimensionally arranged quantized coefficients in units of 64 quantized coefficients (i.e., for each of 8×8-block Y, U, and V components) and outputs coded data and code lengths.

Subsequently, a counter 32 counts the code length signals, detecting the number of input coded data, i.e., the index number. The counter 32 transfers the count result, i.e., the index to a comparator 33. The comparator 33 compares the index with values in an index table 35 as illustrated in FIG. 12. The index table in FIG. 12 stores the numbers of coded data to be allocated to the individual stages as index numbers. That is, in FIG. 12, index numbers 1 to 3, 4 to 8, 9 to 15, and 15 or more are allocated to stages=1, 2, 3, and 4, respectively, for the Y component. The comparator 33 compares these values in the index table in sequence with the outputs from the counter 32. The comparator 33 sends a countup signal to a counter 34 whenever the output value from the counter 32 exceeds the value in the table. The output from the counter 34 indicates a stage number and is initially set at 1. Upon receiving the countup signal, the counter 34 increments its output value; that is, the stage number is incremented by one.

To expand the data coded in accordance with the compression method of this third embodiment by using the compressor/expander shown in FIG. 1, an adaptive Huffman decoder 5' requests a segment controller 6 to send coded data of the stage number 1. The segment controller 6 reads out the coded data at the first stage (number=1) from a compression memory 7 by referring to the contents of a segment information table 10 and transfers the readout data to the adaptive Huffman decoder 5'. The adaptive Huffman decoder 5' decodes the coded data transferred and outputs the stage number to be requested next by making reference to the index table 35. The request for stage numbers and the decoding of obtained coded data are repeatedly performed in the same manner as described above until the number of decoded quantized coefficients becomes 64 (the number of elements in an 8×8 block). When 64 quantized coefficients are decoded, decoding for the next 8×8 block is started.

In the first embodiment (FIG. 3) or the second embodiment (FIG. 9) described above, the bit rate is divisionally assigned to the individual stages on the basis of code lengths. Compared to the first and second embodiments, the use of the method (FIG. 11) of this third embodiment can reduce the dimensions of hardware because of its simple algorithm, thereby realizing the system at low cost, although the precision of the system is lowered. In addition, since no EOS code need be inserted at the end of each stage in one 8×8 block, the quantity of coded data is reduced accordingly.

<Modifications of 1st to 3rd Embodiments>

The above embodiments have been described assuming that the number of stages to which compressed data are assigned is four, but the number of stages may take any value, such as two or three, or five or six.

In addition, although the target bit rate of a whole image is 2.4 [bits/pixel] in the above embodiments, the target bit rate may take any given value.

Furthermore, the target bit rate in the first stage is 1.5 [bits/pixel] and the value of the threshold value table shown in FIG. 5 is determined according to this bit rate in the above embodiments. However, the target bit rate in the first stage need not be 1.5 [bits/pixel] as in the above embodiments but may be any arbitrary value. Although the coded data from the second and subsequent stages are substantially equally divided into three groups, the ratio of the second, third, and fourth stages can take any value, e.g., 3:2:1 or 5:3:1.

Note that the table shown in FIG. 9 is used as the index table as the reference of stage assignment in the third embodiment, but the values are not limited to those shown in FIG. 9.

<4th Embodiment>

The fourth embodiment of the present invention will be described in detail below with reference to the accompanying drawings.

In this fourth embodiment, characters and graphics contained in color images are compressed in accordance with a reversible compression method, whereas natural images are compressed in accordance with the irreversible compression method according to any of the above first to third embodiments, and the resultant compressed data are stored separately into a plurality of stages.

Figure 13:
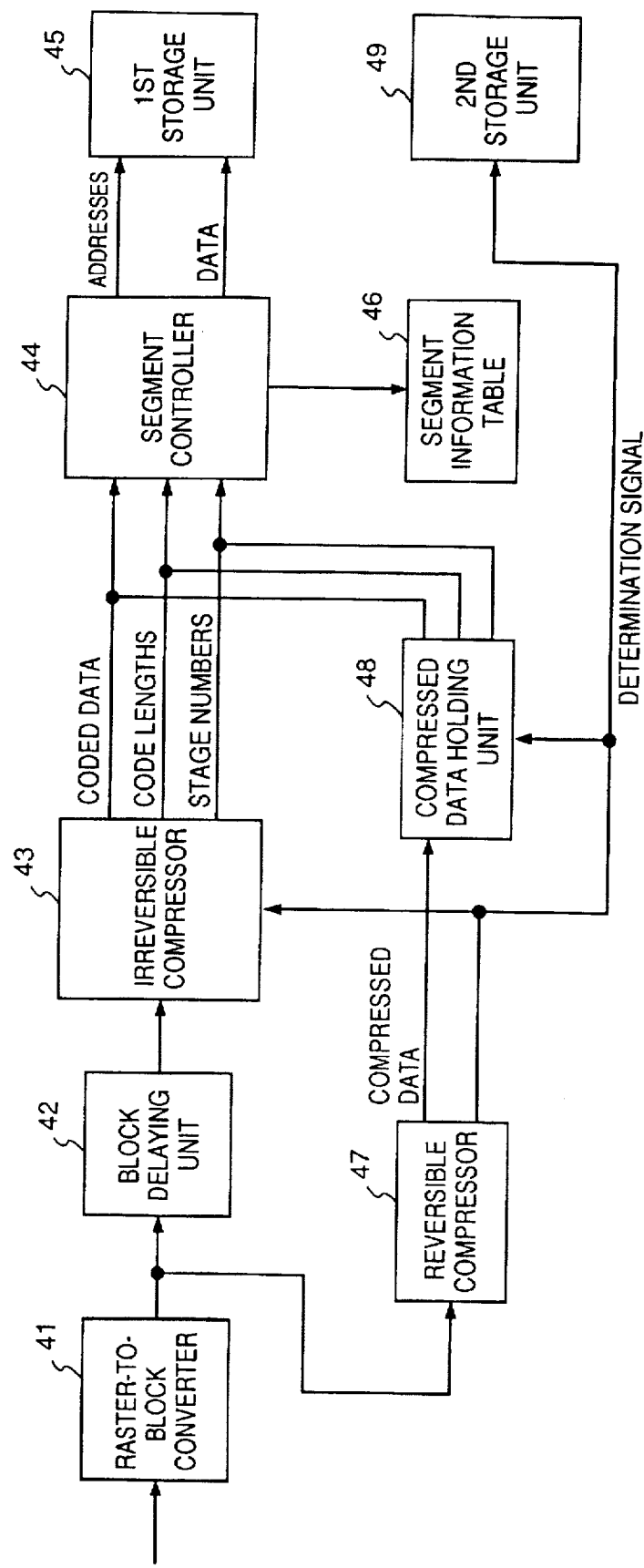
FIG. 13 is a block diagram showing the arrangement of an image compressing apparatus according to the fourth embodiment of the present invention.

FIG. 13 is a schematic block diagram showing the arrangement of an image compressing apparatus according to the fourth embodiment. Referring to FIG. 13, a raster-to-block converter 41 outputs pixel data of 24 bits per pixel, which are supplied in raster sequence, in units of blocks (8×8 pixels). A block delaying unit 42 temporarily stores image data of one block, thereby delaying the image data. An irreversible compressor 43 compresses the image data in accordance with the irreversible compression method; the compressor 43 compresses the block sequential data from the block delaying unit 42 and outputs the compressed coded data divisionally in a plurality of stages. A segment controller 44 can store the coded data divided into multiple stages into a first storage unit 45, which is constituted by a plurality of segments, in accordance with the stages to which the coded data are assigned, as in the above embodiments. This storing means can realize fixed-length compression, and segment numbers selected for the individual stages are stored in a segment information table 46.

A reversible compressor 47 reversibly compresses the block sequentially supplied image data in units of blocks. The reversible compressor 47 stores the result of compression in a compressed data holding unit 48 and also counts the quantity of the compressed data. Assuming that the count result is D and the limit value permitted for that block is L, if L≧D, the block is labeled region 0; if L<D, the block is labeled region 1. The result ("determination signal") is stored in a second storage unit 49. The second storage unit 49, therefore, serves as a block map in which each block is represented by one bit for indicating whether the block is region 0 or region 1. That is, it is determined that the code quantity D exceeds the limit value L in a block found to be region 1.

In the compression system of this fourth embodiment, codes obtained by the reversible coding method are adopted for a block (region 0) in which the quantity of compressed codes obtained by the reversible coding method does not exceed the limit value L, and the irreversible coding is performed for a block (region 1) in which the compressed code quantity exceeds L.

In FIG. 13, since the irreversible compressor 43 codes data delayed by one block, both reversibly compressed coded data and irreversibly compressed coded data of image data of one block are supplied in synchronism with each other to the segment controller 44. In addition, the reversible compressor 47 sends the determination signal described above to the compressed data holding unit 48 and the irreversible compressor 43. That is, the reversible compressor 47 transfers the compressed data of a block found to be region 0, which is stored in the compressed data holding unit 48, to the segment controller 44 On the other hand, the compressed data of a block found to be region 1, which is stored in the compressed data holding unit 48, is rendered invalid by the reversible compressor 47. To compress that block by the irreversible compression method, the reversible compressor 47 transfers a signal instructing this processing to the irreversible compressor 43, causing the irreversible compressor 43 to compress the block. The arrangement and the operation of the irreversible compressor 43 are the same as those in the above embodiments and a detailed description thereof will be omitted.

Consider a case in which color images containing characters, graphics, natural images, and the like formed by color DTP are supplied to the system shown in FIG. 13. In this case, CG images, such as characters and graphics that are compressed using a reversible compression method, have a high compression efficiency to yield D<L, so it is preferable to compress them by the reversible compression method with good restoring properties. Since, on the other hand, natural images have a large variation in pixel values, the data quantity cannot be expected to be reduced by the reversible compression. The natural images, therefore, are desirably compressed by the irreversible compression method with a high compression efficiency.

According to the process of the fourth embodiment, of color images containing characters, graphics, natural images, and the like formed by color DTP, CG images, such as characters and graphics, can be compressed by the reversible compression method, and natural images can be compressed by the irreversible compression method.

A process of expanding the compressed data will be described below with reference to FIG. 14.

FIG. 14 is a schematic block diagram showing the arrangement of an image expanding apparatus according to the fourth embodiment, in which the same reference numerals as in FIG. 13 denote the same parts. This expanding apparatus performs expansion by using the system shown in FIG. 13 on the basis of the data stored in the first storage unit 45 and the second storage unit 49.

In accordance with coded data and code length requested by an irreversible expander 51 or a reversible expander 52, the segment controller 44 generates an address of the first storage unit 45 divided into a plurality of segments by referring to the segment information table 46 and transfers the coded data to the irreversible expander 51 or the reversible expander 52.

The irreversible expander 51 is for expanding data compressed by the irreversible compressor 43 shown in FIG. 13 and generates the code lengths and the stage numbers of coded data that the expander 51 itself requests. The irreversible expander 51 expands the coded data generated and transfers the expanded data to a switching unit 53 in units of blocks.

The reversible expander 52 is for expanding data compressed by the reversible compressor 47 shown in FIG. 13 and generates the code lengths and the stage numbers of coded data that the expander 52 itself requests. The reversible expander 52 expands the coded data generated and transfers the expanded data to the switching unit 53 in units of blocks.

The switching unit 53 selectively outputs the input data on the basis of bit information stored in the second storage unit 49. For example, the switching unit 53 selects the data from the reversible expander 52 when the bit information is "0", and the data from the irreversible expander 51 when the bit information is "1". A block-to-raster converter 54 raster-sequentially converts the output block sequential data from the switching unit 53, thereby ending the expansion process.

According to this fourth embodiment, degradation in characters and graphics formed by CG can be prevented by the combination of the reversible compression method and the irreversible compression method. In addition, the reversible compression method limits compressed data by using a limit value, and the irreversible compression method divides output compressed data into multiple stages and stores them in the memory separated into a plurality of segments, making control of the quantity of the compressed data possible.

<Modifications of 4th Embodiment>

The reversible compressor 47 described above can be modified as long as it comprises means for counting compressed data in accordance with a reversible compression method, means for setting a limit value L, and means for comparing a count result D with the limit value L and outputting the comparison result.

In the above fourth embodiment, in storing the compressed data, which are divided into multiple stages, into the compression memory 7 separated into a plurality of segments, these compressed data are rendered invalid in decreasing order of stage number from the one having the largest stage number (stage 4) to the one having the smallest stage number (stage 1). The present invention, however, is not limited to the above embodiment, and the compressed data can be adaptively, selectively rendered invalid.

Figure 11:
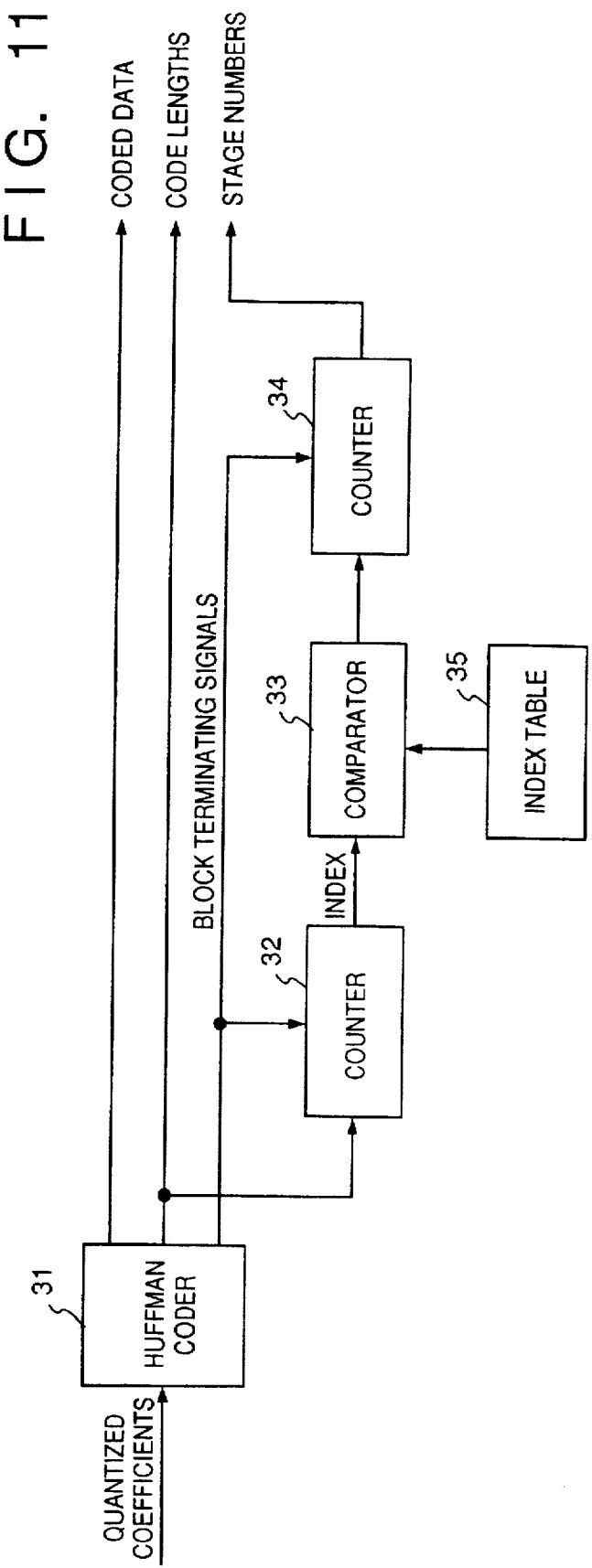
FIG. 11 is a block diagram showing the arrangement of an adaptive Huffman coder according to the third embodiment of the present invention.

In addition, the segment information table is not limited to that illustrated in FIG. 11 but can be modified without departing from the scope of the present invention.

The present invention is applicable to both a system constituted by a plurality of devices and an apparatus consisting of one device.

Although the operation of each of the above embodiments is realized by hardware logic, the present invention can be, of course, applied to a system in which its operation is achieved by programs.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   means for dividing an image into a plurality of blocks;
   conversion means for orthogonally-converting image data of the plurality of blocks into frequency coefficients;
   coding means for coding the frequency coefficients generated by the converting means into variable length codes;

extraction means for extracting, from the variable length codes, a first variable length code corresponding to a first frequency component and a second variable length code corresponding to a second frequency component, the second frequency component being less significant than that of the first frequency component;

storage means for storing the first and second frequency components extracted by the extraction means; and control means for controlling the storage means and extraction means to cancel a portion of the second variable length codes which have been stored in the storage means, if the storage means is full, and to store first variable length codes into the storage means, cancellation and storage of the variable length codes in the storage means being made in accordance with a volume of first variable length codes coded by the coding means.

2. An image processing apparatus according to claim 1, wherein the first frequency components have a higher frequency than that of the second frequency components.

3. An image processing apparatus according to claim 1, wherein the extraction means further extracts a third variable length code corresponding to a third frequency component, and the storage means stores the extracted third variable length code.

4. An image processing apparatus according to claim 3, wherein the control means controls the storage means and extraction means to cancel a portion (ranging, selectively, from none to all) of the second variable length codes which have been stored in the storage means, and to store third variable length codes into the storage means, cancellation and storage of the variable length codes being made in accordance with a volume of third variable length codes coded by the coding means.

5. An image processing apparatus according to claim 4, wherein the third frequency components have a frequency that is higher than that of the first frequency components, and is lower than that of the second frequency components.

6. An image processing apparatus according to claim 1, wherein the cancellation and storage of variable length codes in the storage means is performed in accordance with the volume of first variable length codes coded by the coding means, and a storage capacity of the storage means.

7. An image processing method comprising the steps of:

dividing an image into a plurality of blocks;

orthogonally-converting image data of the plurality of blocks into frequency coefficients;

coding the frequency coefficients generated by the converting means into a plurality of variable length codes;

extracting, from the plurality of variable length codes, a first variable length code corresponding to a first frequency component and a second variable length code corresponding to a second frequency component, the second frequency component being less significant than that of the first frequency component;

storing the first and second frequency components extracted in the extraction step into a storage means; and controlling the storage means to cancel a portion of the second variable length codes which have been stored in the storage means, it the storage means is full and to store first variable length codes into the storage means, cancellation and storage of the variable length codes being made in accordance with a volume of first variable length codes coded.

* * * * *

UNITED STATES PATENT AND TRADEMARK OFFICE
CERTIFICATE OF CORRECTION

PATENT NO. : 5,761,345

DATED : June 2, 1998

INVENTORS : KAZUHIRO SAITO ET AL.

It is certified that error appears in the above-identified patent and that said Letters Patent is hereby corrected as shown below:

ON TITLE PAGE

[57] In the Abstract

"fre-" should read --less significant fre--.

[56] References Cited

"2122763" should read --2-122763--.

IN THE DRAWINGS

Sheet 7 of 13  "INDIVISUAL" should read --INDIVIDUAL--.

COLUMN 1 line 37, "V." should read --V,--.

COLUMN 3 line 24, "Y U:V" should read --Y:U:V--.

UNITED STATES PATENT AND TRADEMARK OFFICE
CERTIFICATE OF CORRECTION

PATENT NO. : 5,761,345

DATED : June 2, 1998

INVENTORS : KAZUHIRO SAITO ET AL.

It is certified that error appears in the above-identified patent and that said Letters Patent is hereby corrected as shown below:

COLUMN 7 line 67,   "unit 31," should read --unit 3'.--.

COLUMN 12 line 47,   "can store" should read --stores--.

Signed and Sealed this

Ninth Day of February, 1999

Attest:

*Attesting Officer*

*Acting Commissioner of Patents and Trademarks*